United States Patent
Frommhold et al.

(10) Patent No.: US 12,406,427 B2
(45) Date of Patent: *Sep. 2, 2025

(54) REPROJECTION FOR HIGH FIELD RATE DISPLAYS

(71) Applicant: Microsoft Technology Licensing, LLC, Redmond, WA (US)

(72) Inventors: Dag Birger Frommhold, Metzingen (DE); Christian Voss-Wolff, Herzberg am Harz (DE); Ashraf Ayman Michail, Kirkland, WA (US)

(73) Assignee: Microsoft Technology Licensing, LLC., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/599,186

(22) Filed: Mar. 7, 2024

(65) Prior Publication Data
US 2024/0355033 A1    Oct. 24, 2024

Related U.S. Application Data

(63) Continuation of application No. 17/750,266, filed on May 20, 2022, now Pat. No. 11,954,786.

(51) Int. Cl.
*G06T 15/00* (2011.01)
*G02B 27/00* (2006.01)
*G02B 27/01* (2006.01)
*G06F 3/147* (2006.01)
*G09G 3/00* (2006.01)

(52) U.S. Cl.
CPC ........ *G06T 15/005* (2013.01); *G02B 27/0093* (2013.01); *G02B 27/0179* (2013.01); *G06F 3/147* (2013.01); *G09G 3/003* (2013.01); *G02B 2027/014* (2013.01); *G02B 27/0172* (2013.01); *G02B 2027/0187* (2013.01); *G09G 2310/0235* (2013.01); *G09G 2340/0435* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2017/0213388 A1* | 7/2017 | Margolis | G06T 13/00 |
| 2017/0374343 A1* | 12/2017 | Boulton | H04N 13/117 |
| 2017/0374344 A1* | 12/2017 | Boulton | G06T 19/00 |

FOREIGN PATENT DOCUMENTS

EP    3025312 B1 * 11/2019 ........... G02B 27/017

* cited by examiner

Primary Examiner — Jwalant Amin
(74) Attorney, Agent, or Firm — Barta Jones, PLLC

(57) ABSTRACT

In various examples there is a method performed by a Head Mounted Display, HMD, comprising a high field rate display configured to display fields of rendered frames at a field rate. The method comprises receiving a stream of the rendered frames for display on the high field rate display, the stream of rendered frames having a frame rate. The process applies an early stage reprojection to the rendered frames of the stream of rendered frames at a rate which is lower than the field rate. The process applies a late stage reprojection to fields of the rendered frames at the field rate, wherein the early stage reprojection uses more computational resources than the late reprojection.

20 Claims, 8 Drawing Sheets

REPROJECTION FOR HIGH FIELD RATE DISPLAYS

CROSS-REFERENCE TO RELATED APPLICATION

This application is a continuation application of and claims priority to U.S. patent application Ser. No. 17/750,266, entitled "REPROJECTION FOR HIGH FIELD RATE DISPLAYS," filed on May 20, 2022, the disclosure of which is incorporated herein by reference in its entirety.

BACKGROUND

High field rate displays present to an observer several fields of an image in sequence. The fields are displayed at a field rate which is fast enough that the fields are perceived as a single frame by the human eye. The human eye uses a process called temporal integration to blend the fields. Field sequential color FSC displays are an example of a type of high field rate display where the fields are monocolored fields. FSC displays achieve much lower power consumption and higher spatial resolution compared to liquid crystal displays (LCD) as no spatial color filtered subpixels are used. Therefore, FSC displays are suitable for micro-displays used in virtual reality (VR) and augmented reality (AR) headsets.

Reprojection is a process often applied when displaying holograms using augmented reality devices. When rendering from a 3D model to obtain images for display at a head mounted display (HMD), a rendering system uses information regarding the pose of the HMD (i.e., the orientation and 3D position of the HMD) so the rendered images are consistent with the HMD viewpoint. However, rendering from a 3D model incurs latency, especially where the 3D model is complex. During the rendering latency the HMD often moves leading to inconsistency between the viewpoint of the rendered images and the viewpoint of the HMD. To reduce this inconsistency, reprojection is typically employed.

The embodiments described below are not limited to implementations which solve any or all of the disadvantages of known reprojection technology.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method performed by a Head Mounted Display, HMD, comprising a high field rate display configured to display fields of rendered frames at a field rate. The method comprises receiving a stream of the rendered frames for display on the high field rate display, the stream of rendered frames having a frame rate. The process applies an early stage reprojection to the rendered frames of the stream of rendered frames at a rate which is lower than the field rate. The process applies a late stage reprojection to fields of the rendered frames at the field rate, wherein early stage reprojection uses more computational resources than the late stage reprojection.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Figure 1A:
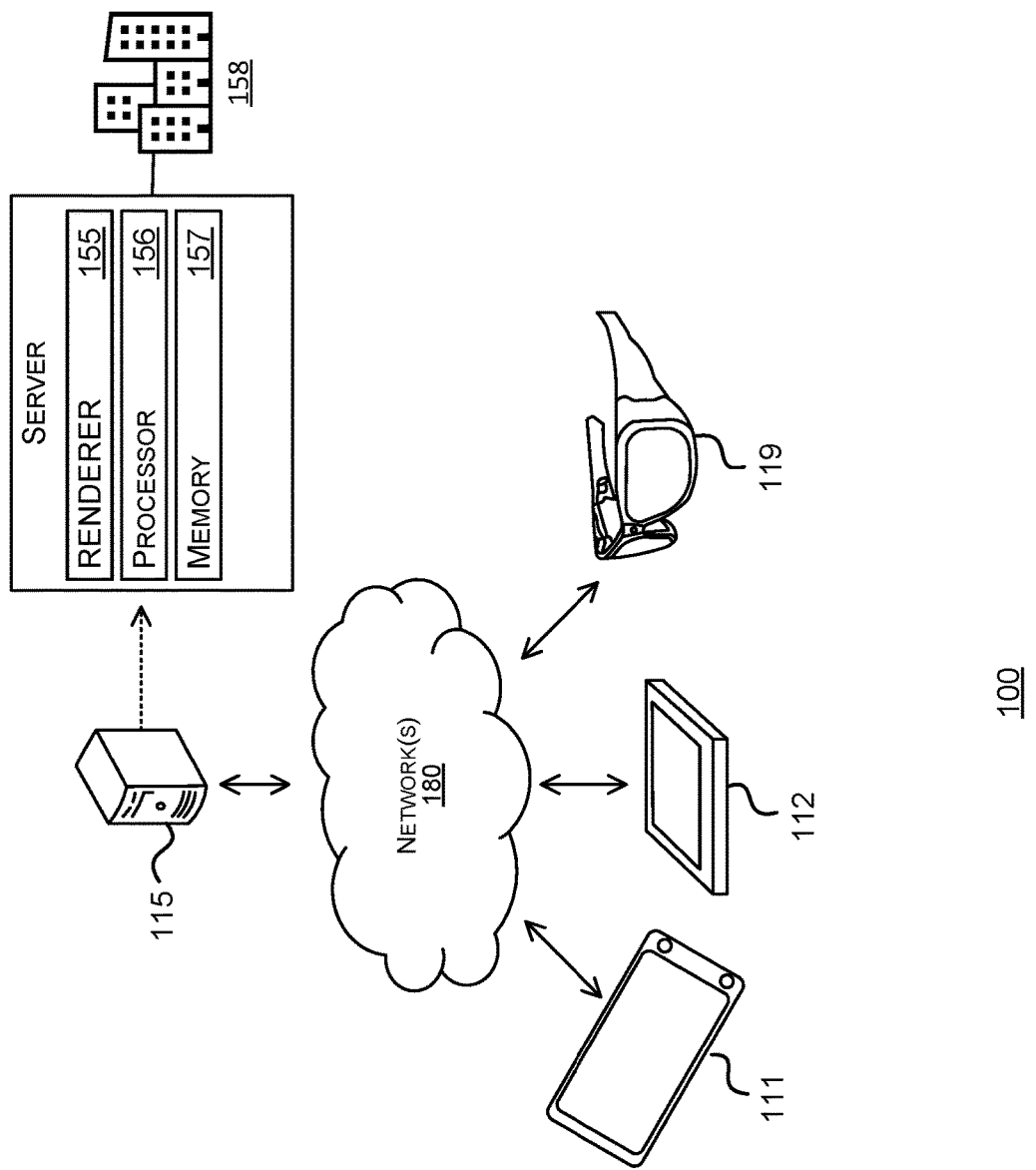
FIG. 1A is a schematic diagram of a communications network configured to facilitate the rendering of holograms on a high field rate display in an HMD.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Displays which operate at high field rates, such as but not limited to field sequential color (FSC) displays, operate by sequentially displaying different fields of an image at a field rate which is the rate at which each field of an image frame is displayed. For example, for red, green, blue (RGB) images, an FSC display displays a red field followed by a green field followed by a blue field of an image in succession before displaying the red, green and blue fields in succession for the next image. Errors in FSC images, such as color separation artifacts (or "color breakup"), are caused by the imperfect overlap of fields on the retina caused by a relative velocity between displayed objects and an observer's eyes (e.g., after sudden movements of the user's eyes). To reduce such errors, FSC displays use high field rates. More generally, other displays which operate at high field rates often suffer from double imaging.

As explained above reprojection is a process used to reduce inconsistency between an image rendered from a 3D model for a given pose, and an image consistent with a current pose of an HMD or other high field rate display device. Reprojection is a process of manipulating an image by warping or applying a transform to reduce the inconsistency. Reprojection is typically a process performed by hardware at a high field rate display device.

Reprojection serves the purpose of minimizing motion-to-photon latency, which, in the case of HMDs, is important for ensuring user comfort and creating the impression of stable, world-locked holograms. Without reprojection, hologram viewers perceive holograms whose position is constantly jittering, constantly swimming, and experience visual artifacts which are disturbing and can in some cases induce nausea and/or headache. Where holograms break down HMD users find it difficult to operate graphical user interfaces displayed using holograms and to carry out tasks using the HMD hologram user interface.

The inconsistency to be reduced or ameliorated by reprojection is particularly large where there is rendering from complex 3D models. In gaming and other scenarios, a complex 3D model has millions of parameters (such as millions of vertices of a mesh model). Rendering from such a complex 3D model is computationally highly expensive and often involves the use of specialist graphics processing units GPUs and other hardware. Typically, such computationally expensive tasks are off loaded from an HMD to the cloud, a companion computing device, or an edge computing device.

In one example, to increase the detail and quality of the rendered holograms, computational expensive rendering tasks are performed on external computing resources such as a cloud server or a companion device in communication with the HMD. In this way, the HMD computing resources are kept low.

High field rates pose a significant challenge as they require reprojections to be able to execute in a very short time span. Since an HMD is a resource constrained device there are also constraints on power. Thus, for various reasons there has been a prejudice against running sophisticated reprojections at field rate. This in turn limits the amount of latency that reprojections can compensate for in HMDs with high field rate displays and thus tends to restrict use of HMDs with high field rate displays to scenarios with local rendering (rather than e.g., cloud-based rendering).

The inventors have found that by using a two-stage approach it is possible to enable high quality reprojection for high field rate displays.

An early stage reprojection runs at a lower frequency (typically, but not always, a rate at which new frames are rendered) and is combined with a simpler, efficient reprojection at a higher rate such as, but not always, the field rate of the high field rate display.

As the early stage reprojection runs at lower rate, it can use a significantly more sophisticated or more complex process at the same power/performance cost of a per-field reprojection. The greater complexity in the early stage reprojection arises due to factors such as the reprojection being more computationally demanding and/or the reprojection processing a larger amount of data. For example, it can run at pixel accuracy and leverage additional data sources (e.g., additional views, the other image of a stereo pair, or previous frames) or neural networks to increase quality. The early stage reprojection operation is used to correct for the delta between the pose the incoming frame was rendered with and an updated forward-predicted pose at the time of the early stage reprojection operation. The remaining latency—and thus the remaining pose error—can then be compensated for with a much simpler, more efficient reprojection process.

The two-stage approach is performed by a Head Mounted Display (HMD) which comprises a high field rate display configured to display fields of rendered frames at a field rate. A stream of rendered frames is received for display on the high field rate display, the stream of rendered frames having a frame rate. An early stage reprojection is applied to the rendered frames of the steam at a rate lower than the field rate. The late stage reprojection is applied to the fields of the rendered frames, wherein the early stage reprojection uses more computation resources compared to the late stage reprojection.

By using an early and a late stage reprojection in this way it is possible to significantly reduce motion-to-photon latency as well as color separation artifacts, even where rendering latency is high. The early stage reprojection is sophisticated enough to account for the pose error of the received rendered frames and the late stage reprojection is efficient enough to operate at the field rate.

The result is superior to reprojection solutions for high field rate displays, such as FSC displays, which implement a single, simple reprojection for each field of the rendered image. The approach described herein enables higher latencies (and thus pose errors) to be compensated for by "resetting" the clock for reprojection. Since the subsequent higher rate per-field reprojection steps compensate for a small amount of latency (and thus pose error) from when the lower-rate reprojection starts to the point in time when the image is displayed, the higher rate per-field reprojection can typically be very efficient with respect to usage, allocation, and management of computing resources (e.g., memory, processing, and bandwidth). This provides the benefit of offsetting the additional computational costs incurred by the lower-rate and more sophisticated reprojection. Overall, the approach described herein improves the functioning of the underlying device reprojection steps.

In various examples, the rendered frames are red green blue depth RGBD frames and a depth channel of the RGBD frames is used by the early stage reprojection. By including a depth channel in the rendered frames it is possible for the early stage reprojection to take into account the depth information and achieve a high quality result.

In various examples, the method further comprises receiving a pose of the HMD which was used to render the received rendered frame and using the received pose of the HMD and a current predicted pose of the HMD as input to the early stage reprojection. In this way the early stage reprojection is able to achieve high quality performance.

In various examples the late stage reprojection is carried out in series for each field of a frame and using, for each field, a pose of the HMD received just in time for the late stage reprojection. Using the poses just in time facilitates extremely high quality performance since the poses are highly accurate.

In various examples the late stage reprojection is carried out at a specified time per field and the late stage reprojection uses a predicted pose of the HMD for each of the fields, the predicted pose computed by the HMD. Using predicted poses enables high accuracy to be achieved. For example, the predicted pose computed by the HMD is computed using data about a motion path of the HMD. Using a motion path is found particularly effective.

In examples the observed predicted pose of the HMD is computed, at least in part, using data from an inertial measurement unit, IMU. Using an IMU in the HMD is practical and gives an efficient way to obtain a predicted pose of the HMD. In other examples, the observed predicted pose of the HMD is obtained using a combination of an IMU, a set of cameras and additional sensors mounted on the HMD that provide positional information.

In various examples the late stage reprojection comprises any one or more of: a homography, a planar reprojection, a depth reprojection, a motion reprojection. This gives efficient and effective reprojection which is operable at field rate.

FIG. 1A illustrates deployments where reprojection is implemented for situations where there is a complex 3D model 158 stored in the cloud or at an edge computing device. In the example of FIG. 1A the complex 3D model 158 is of a city and comprises many millions of vertices where the 3D model 158 is a mesh model. Using a model of a city is an example only and is not intended to be limiting. The 3D model is of any object or scene.

FIG. 1A shows a networked computing environment 100 in which the disclosed technology is deployed in some cases. Networked computing environment 100 includes a plurality of computing devices interconnected through one or more networks 180. The one or more networks 180 allow a particular computing device to connect to and communicate with another computing device. The depicted computing devices include smart phone 111, tablet computer 112, head mounted display (HMD) 119, and server 115. In some embodiments, the plurality of computing devices includes additional computing devices not shown. In some embodiments, the plurality of computing devices includes more than or less than the number of computing devices shown in FIG. 1A. In some embodiments, the one or more networks 180 includes a secure network such as an enterprise private network, an unsecure network such as a wireless open network, a local area network (LAN), a wide area network (WAN), and the Internet. In some embodiments, each network of the one or more networks 180 includes hubs, bridges, routers, switches, and/or wired transmission media such as a wired network or direct-wired connection.

Server 115 is a cloud server in some cases, such as deployed in a data centre or cluster of compute servers. The server has access to the complex 3D model 158. The server comprises a renderer 155 which is any conventional renderer for rendering images from the complex 3D model. The renderer uses ray tracing or other well known rendering processes to render images from the complex 3D model from a virtual camera with a specified 3D position and orientation referred to as a pose. The renderer executes on one or more processors 156 in the server which comprise graphics processing units in some cases. The server also has memory 157.

The computing devices are able to communicate with the server 115 via the network 180. The HMD 119 is able to send a query comprising its pose (3D position and orientation) to the server 115. The server 115 renders an image from the complex 3D model 158 in response to the query and using the pose. The rendered image is returned to the HMD via the network 180. Latency is thus introduced by the processing at the server 115 and by the communication over network 180. Latency is also induced by processing which takes place on the HMD (e.g., video decoding, central processing unit CPU-side overhead for network transmission). Reprojection is used at the HMD as described herein to allow for the latency.

In some cases server 115 is an edge computing device such as deployed in an office block or factory. In this case the server operates in the same manner although its physical location is geographically closer to one or more computing devices such as smart phone 111, tablet computer 112 and HMD 119. Again, latency is introduced due to processing at the server and due to communications latency. Reprojection at the HMD is used as described herein.

HMD 119 comprises an optical see-through HMD in some cases. For example, the HMD 119 is worn by an end user and allows actual direct viewing of a real-world environment (e.g., via transparent lenses) and, at the same time, projects images of a virtual object into the visual field of the end user thereby augmenting the real-world environment perceived by the end user with the virtual object.

Utilizing an HMD 119, an end user can move around a real-world environment (e.g., a living room) wearing the HMD 119 and perceive views of the real-world overlaid with images of virtual objects (such as of 3D city 158). The virtual objects appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 115 (i.e., on the server side) while camera localization may be performed on HMD 119 (i.e., on the client side).

The HMD comprises a pose tracker which is any conventional pose tracker functionality. In an example, the pose tracker uses sensor data captured by the HMD. The sensor data depicts characteristics of the environment of the HMD and is fitted to a 3D model of the HMD environment in order to compute the pose of the HMD. The pose of the HMD is a 3D position and an orientation in some cases (i.e. a 6 degree of freedom pose). In some cases features derived from the sensor data are used to query a 3D map of the environment in order to find the pose of the HMD. In some cases the HMD comprises an inertial measurement unit or other sensor such as global positioning system GPS, accelerometer, or other sensor which gives a measurement of the pose of the HMD.

Figure 1B:
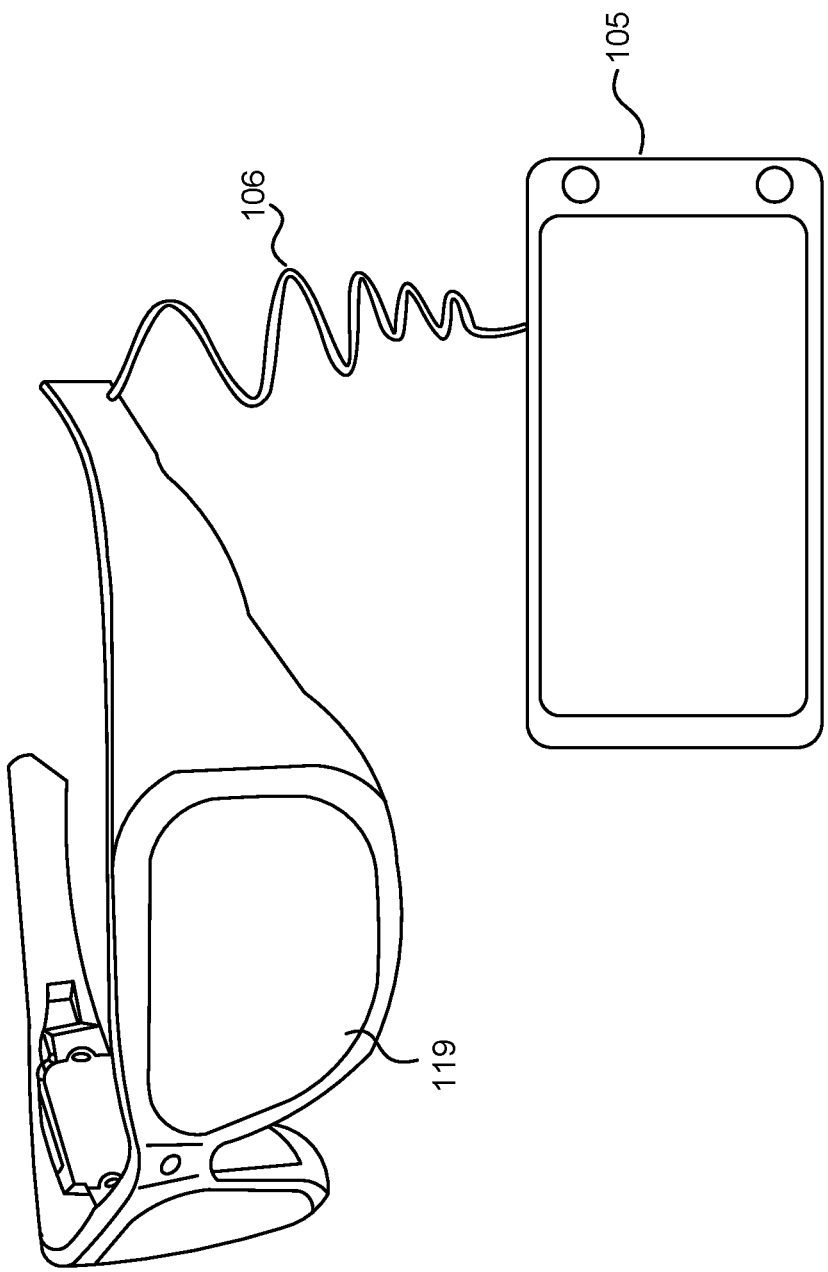
FIG. 1B is a schematic diagram of an HMD connected to a companion device.

FIG. 1B depicts one embodiment of an HMD 119 in communication with a companion device 105. As depicted, HMD 119 communicates with companion device 105 via a wired connection 106. However, the HMD 119 may also communicate with companion device 105 via a wireless connection. In some embodiments, the companion device 105 is used by the HMD 119 in order to offload compute intensive processing tasks (e.g., the rendering of virtual objects) and to store virtual object information and other data that may be used to provide an augmented reality environment on the HMD 119. Companion device 105 may also provide motion and/or orientation information associated with companion device 105 to the HMD 119.

Figure 2:
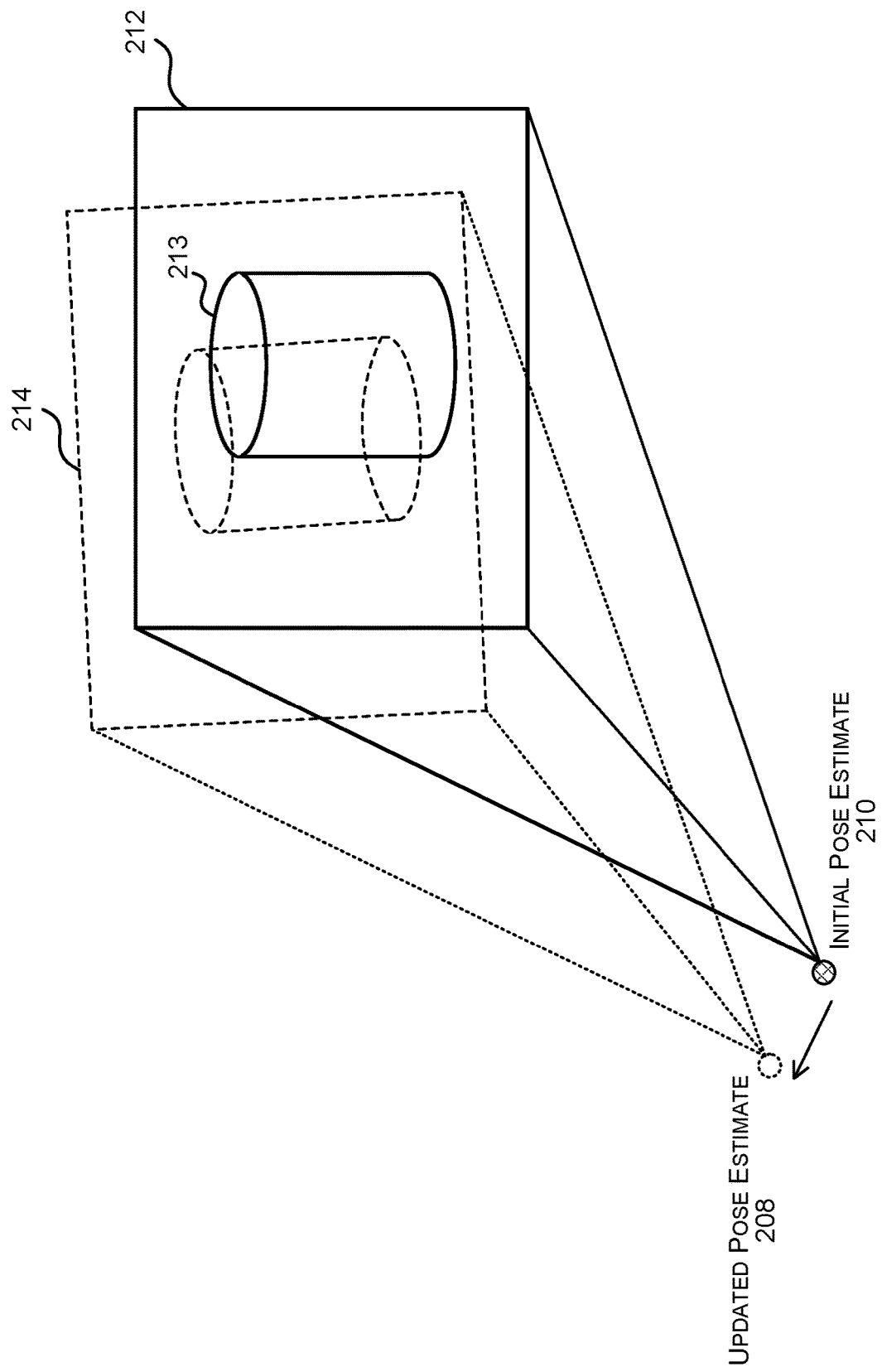
FIG. 2 is a schematic diagram of late stage reprojection of a rendered object.

Reprojection is now explained with reference to FIG. 2. FIG. 2 depicts one example of a portion of a pre-rendered image 212 and an updated image 214 based on the pre-rendered image 212. A pre-rendered image is an image which has been rendered by a computing device which is separate from an HMD, such as a cloud server, edge server, or companion device. An updated image is an image computed from a pre-rendered image using reprojection. As depicted, the pre-rendered image 212 is rendered based on an initial pose estimate for an HMD (e.g., a predicted pose of the HMD 8 ms or 16 ms into the future). The initial pose estimate is determined in some examples based on a current position and orientation of the HMD and an acceleration and a velocity of the HMD immediately prior to determining the initial pose estimate. The pre-rendered image 212 comprises a rendered image based on the initial pose estimate and is rendered using a GPU or other rendering system that has the ability to render a three-dimensional scene into a two-dimensional image given a particular pose. The updated pose estimate is determined based on updated pose information that is acquired at a point in time subsequent to the determination of the initial pose estimate. In one example, the updated pose information is generated based on camera-based pose tracking information and/or a combination of camera-based pose tracking information and low-latency IMU motion information corresponding with the HMD.

In some examples, the updated image 214 is generated using reprojection by applying an image transformation to the pre-rendered image 212 based on a pose difference between the updated pose estimate and the initial pose estimate. In one example, the image transformation comprises an image rotation, translation, resizing (e.g., stretching or shrinking), shifting, or tilting of at least a portion of the pre-rendered image 212. The updated image 214 may be generated via a homographic transformation of the pre-rendered image 212. In some cases, the homographic transformation comprises a multi-plane homography, a single plane homography, and/or an affine homography.

In some examples, the updated image 214 is generated by applying a pixel offset adjustment to the pre-rendered image 212. The degree of the pixel offset adjustment may depend on a difference between the updated pose estimate and the initial pose estimate. As depicted, an image 213 of a virtual object (i.e., a virtual cylinder) has been pixel shifted in both the X-dimension and the Y-dimension (e.g., by 4 pixels to the left and by 3 pixels up). In one example, the updated image 214 is generated using a pixel offset adjustment or a combination of homographic transformations and pixel offset adjustments. The homographic transformations and/or pixel offset adjustments may be generated using a controller or processor integrated with a display. In some cases, the pixel offset adjustments are performed using a display that incorporates shift registers or other circuitry for allowing the shifting of pixel values within a pixel array of the display.

Figure 3A:
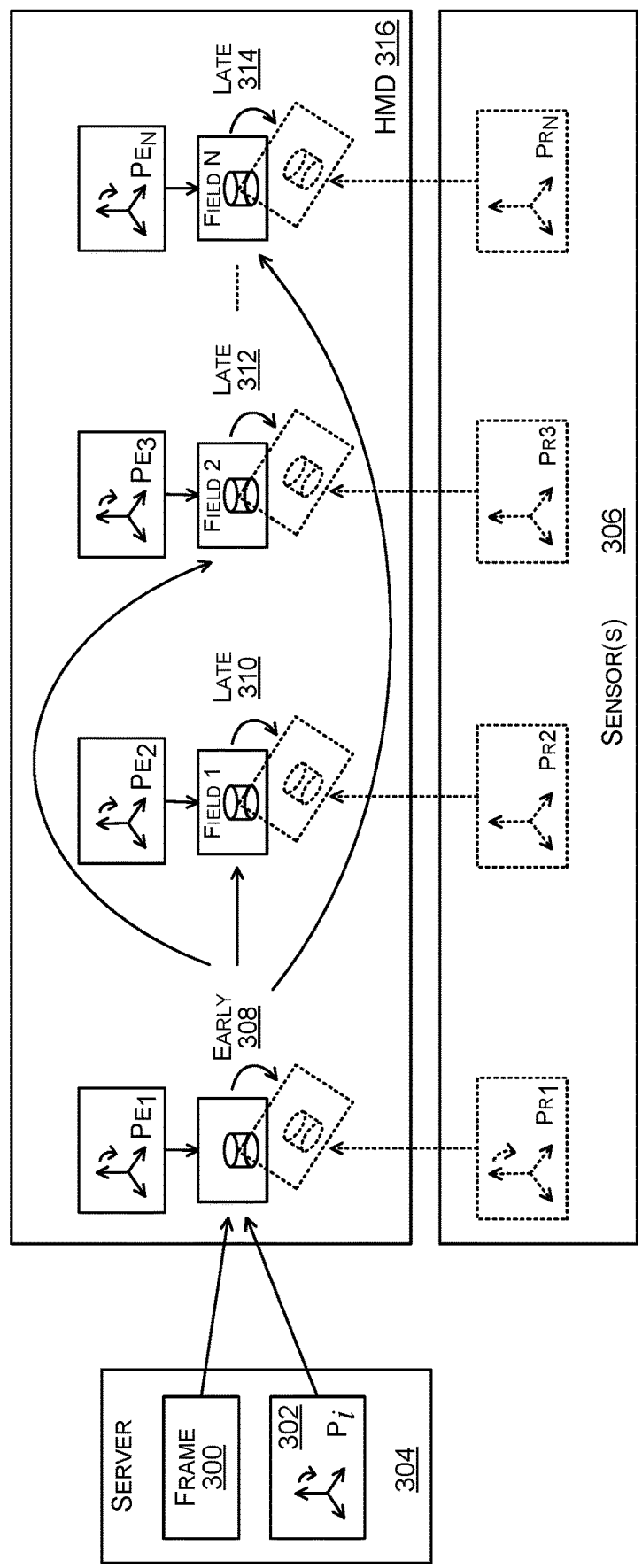
FIG. 3A is a schematic diagram of an example late stage reprojection process for FSC displays.

FIG. 3A is a schematic diagram of an example reprojection process for high field rate displays. FIG. 3A shows a server 304, an HMD 316 and sensor(s) 306 which are in the HMD. FIG. 3A illustrates a process for a single rendered image frame 300 of a stream of rendered image frames. The server 304 renders an image frame 300 with the use of a corresponding initial predicted pose ($P_i$) 302 of the HMD 316. The prediction being what pose the HMD will be in at the time the image frame is displayed to the user. The process depicted in FIG. 3A is repeated for additional rendered image frames in the stream of rendered image frames. The stream of rendered frames is sent from the server to the HMD at a frame rate. In one example, the rendered image frame 300 is rendered from a complex 3D model by the server. Due to the high computational demand of rendering from the complex 3D model, the server 304 with access to more powerful computing resources performs the rendering on a shorter timescale compared to rendering from the 3D model on the HMD. The predicted pose 302 of the HMD 316 is calculated based on information provided by sensors on the HMD 316 or in any other suitable way. The rendered image frame 300 and initial predicted pose 302 are provided to the HMD 316. In one example, the rendered images frame 300 is a red green blue depth RGBD frame.

The HMD 316 performs an early stage reprojection 308 on the received rendered frame 300 by applying an updated pose ($P_{R1}$) of the HMD 316, detected by the sensor(s) 306, which is detected at a time just before the early stage reprojection 308 is performed. The updated pose ($P_{R1}$) is used to calculate an updated predicted pose ($P_{e1}$) of the HMD that is used for the first late stage reprojection 308. The updated pose prediction ($P_{e1}$) is a more accurate pose prediction compared to the initial pose prediction ($P_i$) calculated at the server 304 due to the updated pose data ($P_{R1}$) being based on more recent real HMD pose data.

The rate at which the early stage reprojection 308 is applied to the stream of rendered frames is less than the field rate. In an embodiment, the early stage reprojection 308 is performed at the frame rate (i.e., the rate at which the rendered frames are sent from the server to the HMD). A benefit of performing the early stage reprojection 308 at a lower rate compared to the field rate is that a more sophisticated reprojection method can be employed which can be used to correct the delta between the initial pose prediction ($P_i$) used at the server 304 and the updated pose prediction ($P_{e1}$) more accurately. Typically, the bulk of the latency induced in the display of image frames occurs from the non-local compute unit, which means the delta between pose predictions and the real HMD pose is likely to be comparatively large from the server's initial pose prediction ($P_i$). The sophisticated reprojection performed in the early stage reprojection is therefore well suited to account for this delta. Basic reprojections for each of the fields are less suited to account for such large deltas.

In some examples, the early stage reprojection 308 runs at pixel accuracy. In an example the early stage reprojection 308 leverages data from additional sources (e.g., additional views of the rendered image, the other image of the stereo pair, or the rendered image from previous frames). In some examples the early stage reprojection employs a neural network to increase the quality of the reprojection. In some examples, the early stage reprojection employs planar deviation-based image reprojection and/or per-pixel backwards reprojection. Planar deviation-based image reprojection and per-pixel backwards reprojection may leverage additional rendered views of received rendered image frames to fill in disocclusions resulting from the reprojection.

The HMD 316 performs a late stage reprojection 310, 312, 314 sequentially to the fields of the rendered image frame, where the time between the field reprojections is defined by the field rate. For example, for an image frame comprising RGBD data, the late stage reprojection is applied to the red field, then the blue field and then the green field. FIG. 3A depicts three fields which are reprojected by the late stage reprojection however it is possible for the number of fields to exceed three. In one example, the fields are displayed on the high field rate display directly after the late reprojection is applied.

The late stage reprojections are performed using the rendered image frame that was reprojected using the early stage reprojection. The late stage reprojections use updated pose data ($P_{R2}$, $P_{R3}$, $P_{RN}$) from sensor(s) 306 of the HMD or a pose tracker in the HMD.

The updated pose data from the HMD sensor(s) 306 or pose tracker is detected at the time each field is reprojected. Therefore, because the relatively large pose delta incurred by the pose prediction calculated at the server is accounted for in the early stage reprojection step, the late stage reprojection steps only need to account for relatively small pose deltas as the updated poses are detected at the field rate and therefore only minor adjustments are required to reproject. As a result, the late stage reprojections are performed using less computational resources compared to the early stage reprojections meaning the HMD 316 can repeat the late stage reprojections on the fields of the rendered image frame at the field rate required by high field rate displays, such as FSC displays to minimize color separation and/or double imaging artifacts.

In some examples, the late stage reprojection comprises any one or more of: a homography, a planar reprojection, a depth reprojection, and motion reprojection.

Figure 3B:
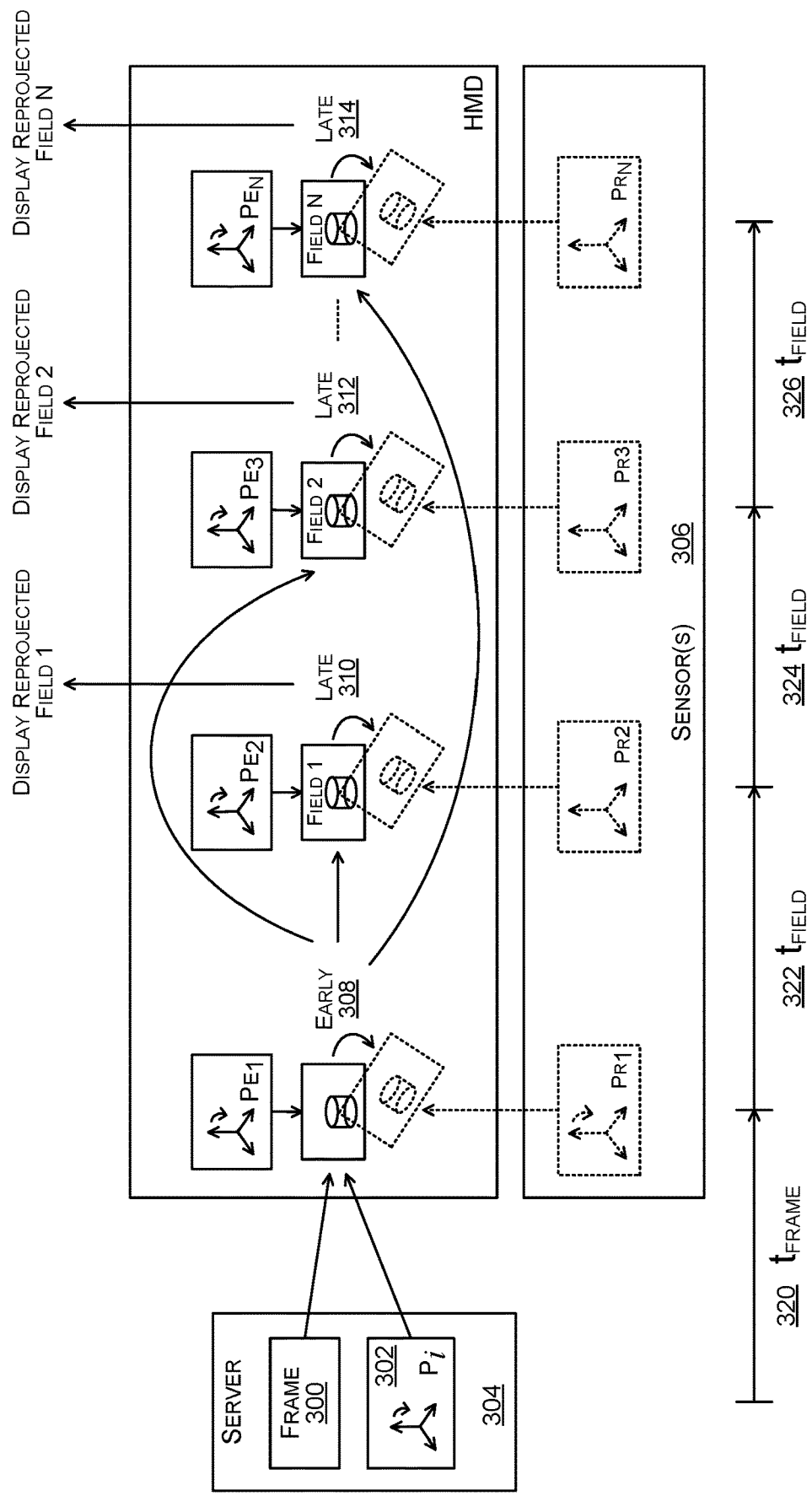
FIG. 3B is the schematic diagram of FIG. 3A with more detail.

FIG. 3B is the same as FIG. 3A with the addition of labels on time intervals between each stage of the process of FIG. 3A. Time interval 320 shows an example of the rate at which the early stage reprojection is applied whereby it is applied at the frame rate ($t_{FRAME}$) which is the rate at which the rendered frames are sent to the HMD from the server. The time intervals 322, 324 and 326 are set by the field rate ($t_{FIELD}$) and are shorter compared to the time interval 320 ($t_{FRAME}$) although the shorter duration is not shown in FIG. 3B for clarity. FIG. 3B also shows the points of the process where each field of the rendered image frame is displayed. In the example shown in FIG. 3B, the fields are displayed following the completion of the late stage reprojection.

Following the display of the fields, a user of the HMD is able to view and, in some examples, interact with the hologram displayed by the high field rate display described herein. In one example, the hologram is a graphical user interface comprising virtual objects which the user can interact with. In another example, the hologram is a complex 3D model which the user can edit or alter in real time.

Figure 4:
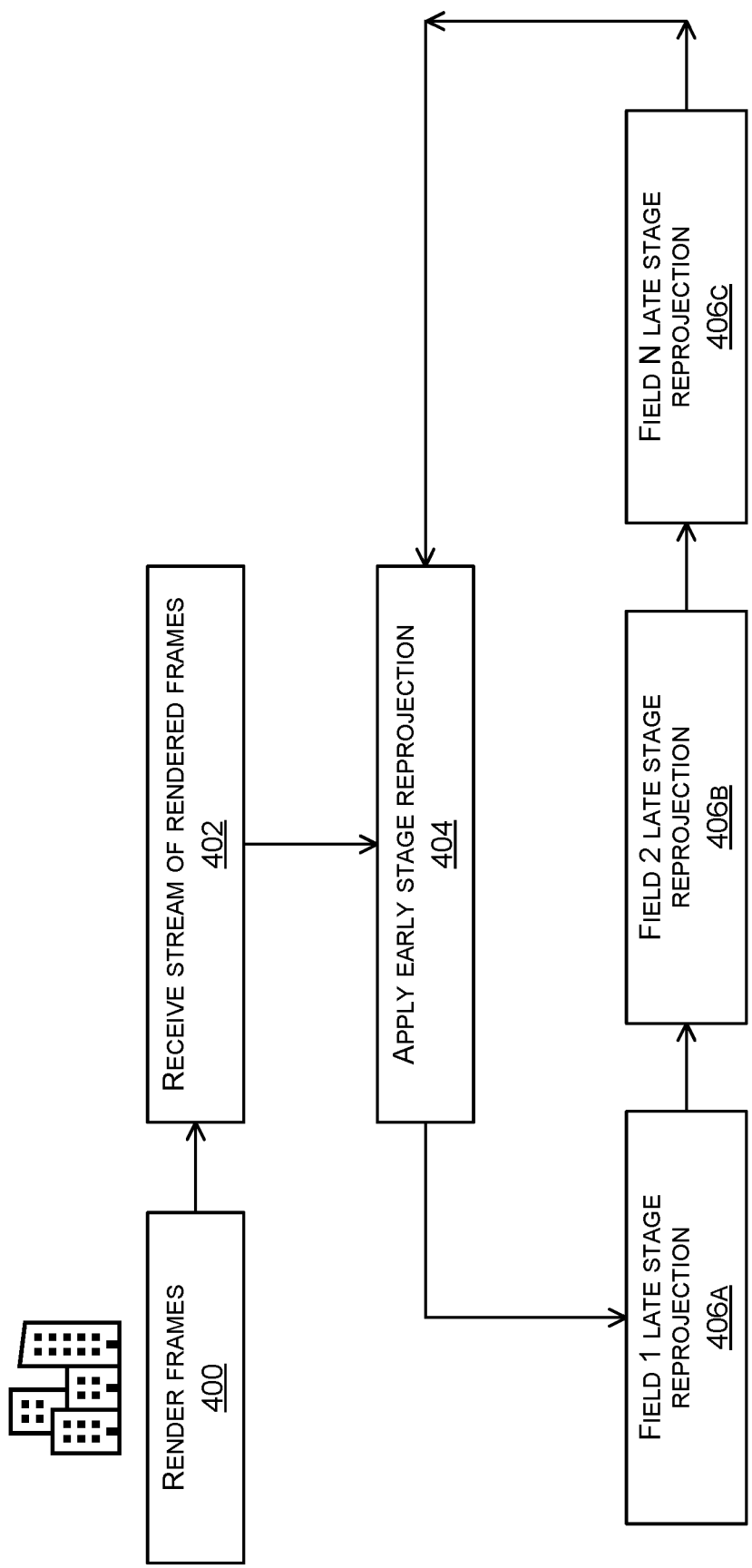
FIG. 4 is a flow diagram of a method of reprojecting multiple fields of a rendered frame for display on a high field rate display.

FIG. 4 is a flow diagram of a method of displaying rendered image frames on a high field rate display. At step 400, image frames are rendered at the server from a 3D model such as a complex 3D model. In one example, a stream of image frames is rendered from a complex 3D model and is rendered on a shorter timescale and with higher quality by the server compared to if it was rendered by an HMD. The rendered image frames are rendered according to a pose such as a predicted pose calculated by the server based on HMD sensor data received from the HMD. In another example the predicted pose is calculated by the HMD and provided to the server. Once an image frame is rendered, it is sent and received by the HMD via any suitable communications network at operation 402. The stream of rendered frames has a frame rate which is a number of frames per second.

The HMD performs an early stage reprojection 404 on the received stream of rendered image frames. In one example, the early stage reprojection is perform on the rendered frames of the stream of rendered frames at the frame rate.

Following the early stage reprojection, a late stage reprojection is performed on fields of the rendered image frames in operations 406a, 406b and 406c. The late stage reprojections are performed at the field rate. The early stage reprojections use more computational resources than the late reprojections. Once the fields of a rendered image frame have been reprojected using the late stage reprojections, the HMD performs the early stage reprojection to the next rendered image frame received by the HMD form the server at step 404. The method of FIG. 4 repeats in order to render and display a stream of image frames at a high field rate display of the HMD.

Figure 5:
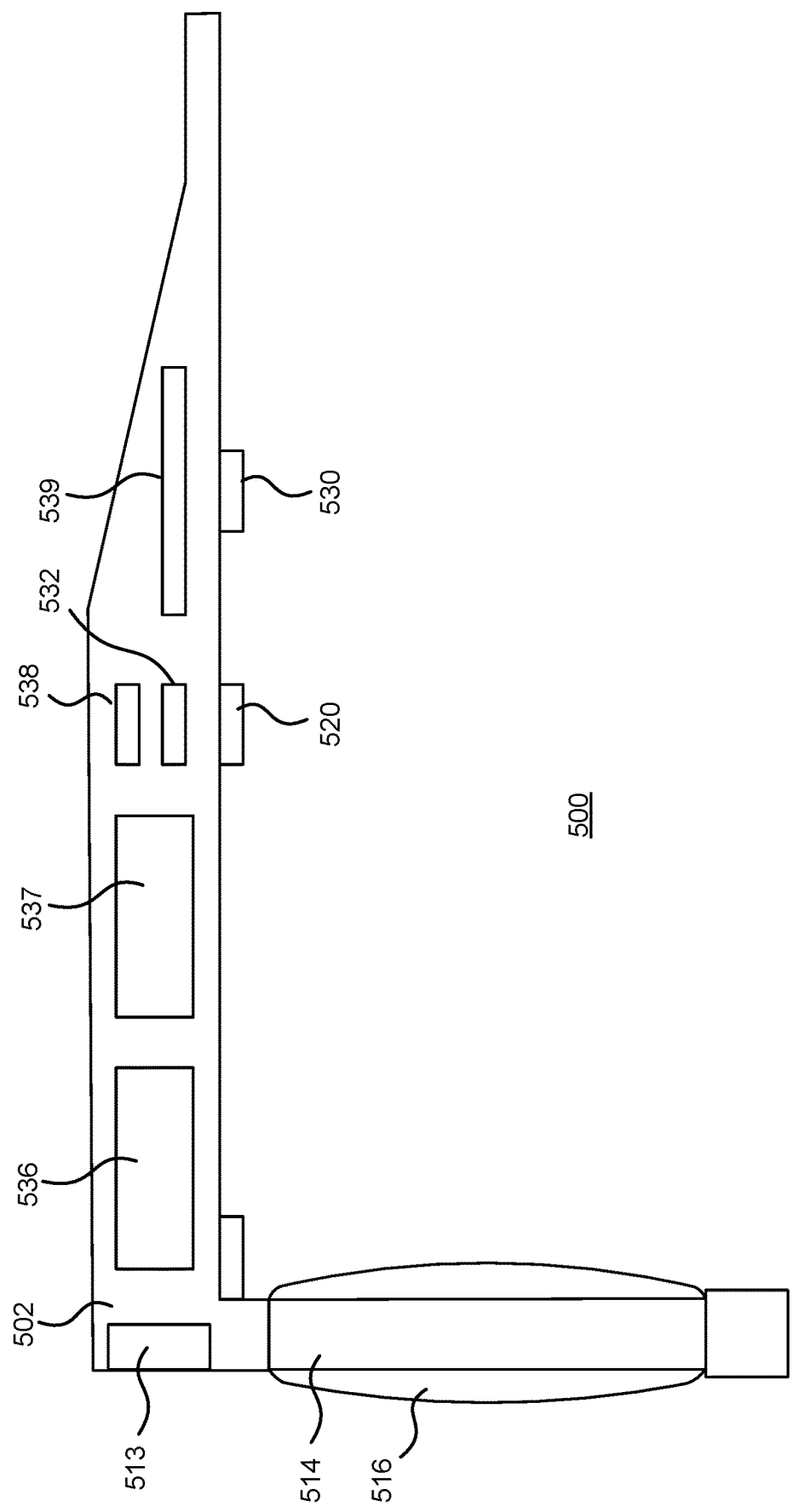
FIG. 5 is a schematic diagram of an example HMD.

FIG. 5 is a schematic diagram of an HMD 500 suitable for use in the examples described herein. The HMD 500 is shown in profile. The HMD has an optical see through display 516 supported on a frame 502 in the style of eye glasses to be worn by a person. Incorporated in or on the frame is a high field rate display 514 (e.g., an FSC display) which projects either directly into eyes of a wearer or onto the optical see through display 516. Incorporated in or on the frame are an early stage reprojection component 538 and a late stage reprojection component 532. The early stage reprojection component 538 implements the complex reprojection described herein using, in some examples, a combination of a central processing unit (CPU) and a graphics processing unit (GPU) or using hardware circuits, such as an application specific integrated circuit (ASIC). In an example a combination of CPU and GPU run a software implementation of the late stage reprojection process. The late stage reprojection component 532 carries out reprojection on fields of frames as described herein. The late stage reprojection component 532 comprises hardware circuits. The HMD 500 comprises a pose tracker 536 which computes a position and orientation of the HMD using captured sensor data. The HMD comprises a plurality of capture devices comprising forward facing camera 513, inertial measurement unit 520 and others. The HMD comprises one or more processors 537 and memory 539 as well as a communications interface 530 to enable the HMD to communicate with other entities over a communications network.

Figure 6:
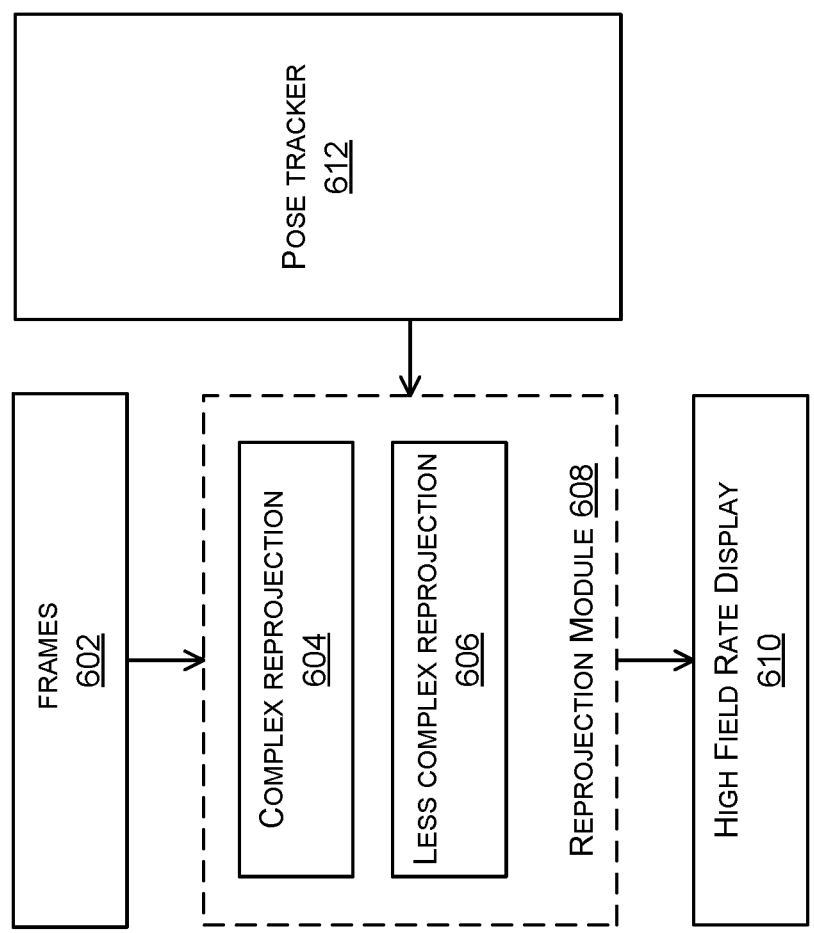
FIG. 6 is a schematic diagram of modules incorporated into an HMD.

FIG. 6 shows some of the components of an HMD in more detail. A reprojection module 608 in an HMD 500 comprises a complex reprojection component 604 and a less complex reprojection component 606. The complex reprojection component 604 implements the sophisticated early stage reprojection described herein and the less complex reprojection component implements the late stage reprojection described herein. The reprojection module 608 is implemented in hardware. It receives input from a pose tracker 612 in the HMD. The pose tracker uses captured sensor data to compute a position and orientation of the HMD. The reprojection module 608 also receives frames 602 as input. The frames are RGBD frames in some examples and are received from another entity external to the HMD. The output of the reprojection module 608 is a stream of fields and these are input to a high field rate display 610 (e.g., an FSC display) as shown.

The early and late reprojections of the disclosure operates in an unconventional manner to achieve the high quality display at an HMD of the disclosure.

Reprojection functionality in an HMD improves the functioning of the underlying HMD by carrying out an early stage reprojection on a frame and carrying out a late stage reprojection on fields of the frame.

Alternatively or in addition to the other examples described herein, examples include any combination of the following:

Clause A. A method performed by a Head Mounted Display, HMD, comprising a high field rate display configured to display fields of rendered frames at a field rate, the method comprising:
    receiving a stream of the rendered frames for display on the high field rate display, the stream of rendered frames having a frame rate;
    applying an early stage reprojection to the rendered frames of the stream of rendered frames at a rate which is lower than the field rate;
    applying a late stage reprojection to fields of the rendered frames at the field rate, wherein the early stage reprojection uses more computational resources than the late stage reprojection.

Clause B. The method as claimed in clause A, wherein the rendered frames are red green blue depth RGBD frames and wherein a depth channel of the RGBD frames is used by the early stage reprojection.

Clause C. The method as claimed in any preceding clause, wherein the early stage reprojection is applied at the frame rate.

Clause D. The method as claimed in any preceding clause, wherein the early stage reprojection comprises, for each frame, applying a transformation to the frame according to a current pose of the HMD, and the late stage reprojection comprises, for each field, applying a transformation to the field according to a current pose of the HMD; and wherein the current pose of the HMD is obtained using information from sensors in the HMD.

Clause E. The method as claimed in any preceding clause further comprising:
receiving a pose of the HMD which was used to render the received rendered frame;
using the received pose of the HMD and a predicted pose of the HMD as input to the early stage reprojection.

Clause F. The method as claimed in any preceding clause, wherein the applying of the late stage reprojection comprises:
carrying out the late stage reprojection in series for each field of a frame and using, for each field, a pose of the HMD received just in time for the late stage reprojection.

Clause G. The method of clause F wherein the late stage reprojection is carried out at a specified time per field and wherein the late stage reprojection uses a predicted pose of the HMD for each of the fields, the predicted pose computed by the HMD.

Clause H. The method of clause G wherein the predicted pose computed by the HMD is computed using data about a motion path of the HMD.

Clause I. The method of clause E wherein the predicted pose of the HMD is computed using data from an inertial measurement unit, IMU.

Clause J. The method as claimed in any preceding clause, wherein the fields of the rendered frames are displayed on the high field rate display following the completion of the late stage reprojection.

Clause K. The method as claimed in any preceding clause, wherein the early stage reprojection comprises at least one of: planar deviation-based image reprojection, per-pixel backwards reprojection, wherein planar deviation-based image reprojection and per-pixel backwards reprojection leverage additional rendered views of the rendered frames.

Clause L. The method as claimed in any preceding clause, wherein the late stage reprojection comprises any one or more of: a homography, a planar reprojection, a depth reprojection and a motion reprojection.

Clause M. The method of any preceding clause, wherein the stream of rendered frames is received from a remote entity which has rendered the frames from a complex 3D model.

Clause N. The method of any preceding clause, wherein the steam of rendered frames is received from a companion device connected to the HMD.

Clause O. A head mounted display HMD comprising:
a high field rate display for displaying fields of rendered frames at a field rate;
a processing unit configured to:
receive a stream of rendered frames, the stream of rendered frames having a frame rate;
apply an early stage reprojection to the individual rendered frames of the stream of rendered frames at a rate which is lower than the field rate;
subsequently apply a late stage reprojection to fields of the rendered frames of the received stream at the field rate, wherein the early stage reprojection uses more computational resources compared to the late stage reprojection.

Clause P. The apparatus of clause O wherein the early stage reprojection is applied at the frame rate.

Clause Q. The apparatus of clause O or P wherein processing unit is arranged such that the early stage reprojection comprises, for each frame, applying a transformation to the frame according to a current pose of the HMD, and the late stage reprojection comprises, for each field, applying a transformation to the field according to a current pose of the HMD; and wherein the current pose of the HMD is obtained from sensors in the HMD.

Clause R. The apparatus of any of clauses O to Q wherein the processing unit is arranged to receive a pose of the HMD which was used to render the received rendered frame, and to use the received pose of the HMD and a current observed pose of the HMD as input to the early stage reprojection.

Clause S. The apparatus of any of clauses O to R wherein the processing unit is arranged to carry out the late stage reprojection in series for each field of a frame and using, for each field, a pose of the HMD received just in time for the late stage reprojection.

Clause T. A method performed by a Head Mounted Display, HMD, comprising a high field rate display configured to display fields of rendered frames at a field rate, the method comprising:
receiving a stream of the rendered frames for display on the high field rate display, the stream of rendered frames having a frame rate;
applying an early stage reprojection to the rendered frames of the stream of rendered frames at a rate which is the frame rate;
applying a late stage reprojection to fields of the rendered frames at the field rate, wherein the early stage reprojection is more complex than the late stage reprojection.

Clause U. A head mounted display HMD comprising:
a high field rate display configured to display fields of rendered frames at a field rate;
a processing unit configured to:
receive a stream of rendered frames, the stream of rendered frames having a frame rate;
apply an early stage reprojection to the individual rendered frames of the stream of rendered frames at a rate which is lower than the field rate;
subsequently apply a late stage reprojection to fields of the rendered frames of the received stream at the field rate, wherein the early stage reprojection uses more computational resources compared to the late stage reprojection.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method comprising:
   receiving a stream of rendered frames;
   applying an early stage reprojection to rendered frames in the stream of rendered frames at a rate which is lower than a field rate of a display, thereby correcting for a delta between an initial pose prediction and an updated pose prediction; and
   applying a late stage reprojection to fields of the rendered frames at the field rate, thereby compensating for remaining pose error that is present after application of the early stage reprojection.

2. The method of claim 1, the early stage reprojection being applied at a frame rate at which the stream of rendered frames is received.

3. The method of claim 1, the display being a Head Mounted Display (HMD).

4. The method of claim 3, the initial pose prediction is received from a server and the updated pose prediction is performed by the HMD.

5. The method of claim 1, the initial pose prediction being determined based on one or more of: a current position, an orientation, or an acceleration and a velocity of the display.

6. The method of claim 1, the updated pose prediction being determined based on one or more of: a camera-based pose tracking information or an inertial measurement unit (IMU) information.

7. The method of claim 1, the early stage reprojection comprising one or more of: a planar deviation-based image reprojection or a per-pixel backwards reprojection.

8. The method of claim 1, the late stage reprojection comprising one or more of: a homography, a planar reprojection, a depth reprojection, or a motion reprojection.

9. A computing device comprising:
   a display;
   a processor; and
   a memory storing instructions that upon execution by the processor perform operations comprising:
   receiving a stream of rendered frames;
   applying an early stage reprojection to a rendered frame in the stream of rendered frames at a rate which is lower than a field rate of the display, wherein applying the early stage reprojection corrects for a delta between an initial pose prediction and an updated pose prediction; and
   applying a late stage reprojection to fields of the rendered frame at the field rate, wherein applying the late stage reprojection compensates for remaining pose error that is present after application of the early stage reprojection.

10. The computing device of claim 9, the early stage reprojection being applied at a frame rate at which the stream of rendered frames is received.

11. The computing device of claim 9, the initial pose prediction is received from a server and the updated pose prediction is determined by the processor.

12. The computing device of claim 9, the initial pose prediction being determined based on one or more of: a current position, an orientation, or an acceleration and a velocity of the display.

13. The computing device of claim 9, the updated pose prediction being determined based on one or more of: a camera-based pose tracking information or an inertial measurement unit (IMU) information.

14. The computing device of claim 9, the early stage reprojection comprising one or more of: a planar deviation-based image reprojection or a per-pixel backwards reprojection.

15. The computing device of claim 9, the late stage reprojection comprising one or more of: a homography, a planar reprojection, a depth reprojection, or a motion reprojection.

16. A method comprising:
   receiving a pre-rendered image; and
   computing an updated image from the pre-rendered image using reprojection, the reprojection including:
   applying an early stage reprojection to the pre-rendered image at a rate which is lower than a field rate of a display, the early stage reprojection correcting for a delta between an initial pose prediction and an updated pose prediction; and computing the updated image by applying a late stage reprojection to fields of the pre-rendered image at the field rate, the late stage reprojection compensating for remaining pose error that is present after applying the early stage reprojection.

17. The method of claim 16, the initial pose prediction being determined based on one or more of: a current position, an orientation, or an acceleration and a velocity of the display.

18. The method of claim 16, the display being a Head Mounted Display (HMD).

19. The method of claim 18, the pre-rendered image being received from a computing device different from the HMD.

20. The method of claim 18, the initial pose prediction being received from a computing device different from the HMD and the updated pose prediction being determined at the HMD.

\* \* \* \* \*